(12) United States Patent
Harada et al.

(10) Patent No.: US 8,343,665 B2
(45) Date of Patent: Jan. 1, 2013

(54) NEGATIVE ELECTRODE ACTIVE MATERIAL, NONAQUEOUS ELECTROLYTE BATTERY AND BATTERY PACK

(75) Inventors: Yasuhiro Harada, Yokohama (JP); Norio Takami, Yokohama (JP); Hiroki Inagaki, Kawasaki (JP); Keigo Hoshina, Yokohama (JP); Yuki Otani, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/296,824

(22) Filed: Nov. 15, 2011

(65) Prior Publication Data

US 2012/0115032 A1 May 10, 2012

Related U.S. Application Data

(63) Continuation of application No. PCT/JP2009/059080, filed on May 15, 2009.

(51) Int. Cl.
*H01M 4/131* (2010.01)
*H01M 4/485* (2010.01)
*C01G 23/047* (2006.01)

(52) U.S. Cl. .................. 429/231.5; 423/598; 423/610
(58) Field of Classification Search .................. None
See application file for complete search history.

(56) References Cited

U.S. PATENT DOCUMENTS

| 5,545,468 A | 8/1996 | Koshiba et al. |
| 8,003,255 B2 | 8/2011 | Inagaki et al. |
| 2006/0234132 A1 | 10/2006 | Davidson et al. |
| 2009/0053605 A1 | 2/2009 | Harada et al. |
| 2010/0068625 A1* | 3/2010 | Akimoto et al. ........... 429/231.5 |
| 2010/0243968 A1* | 9/2010 | Taniguchi et al. ......... 252/520.2 |

FOREIGN PATENT DOCUMENTS

| JP | 06-275263 | 9/1994 |
| JP | 2001-354421 | 12/2001 |
| JP | 2007-227072 | 9/2007 |
| JP | 2007-227322 | 9/2007 |
| JP | 2007-234233 | 9/2007 |
| JP | 2008-034368 | 2/2008 |
| JP | 2008-117625 | 5/2008 |
| JP | 2008-123787 | 5/2008 |
| JP | 2008-536272 | 9/2008 |
| JP | 2009-032704 | 2/2009 |
| JP | 2009-054298 | 3/2009 |
| JP | 2010-055855 | * 3/2010 |
| WO | WO 2008/111465 | * 9/2008 |

(Continued)

OTHER PUBLICATIONS

International Search Report issued Aug. 11, 2009 in PCT/JP2009/059080 filed May 15, 2009.

(Continued)

*Primary Examiner* — Jonathan Crepeau
(74) *Attorney, Agent, or Firm* — Oblon, Spivak, McClelland, Maier & Neustadt, L.L.P.

(57) ABSTRACT

According to one embodiment, a negative electrode active material includes a compound having a crystal structure of monoclinic titanium dioxide. The compound has a highest intensity peak detected by an X-ray powder diffractometry using a Cu-Kα radiation source. The highest intensity peak is a peak of a (001) plane, (002) plane, or (003) plane. A half-width (2θ) of the highest intensity peak falls within a range of 0.5 degree to 4 degrees.

11 Claims, 8 Drawing Sheets

FOREIGN PATENT DOCUMENTS

| | | |
|---|---|---|
| WO | WO 2009/028530 | 3/2009 |
| WO | WO 2009/028553 | 3/2009 |

OTHER PUBLICATIONS

René Marchand, et al.; "TiO$_2$(B) A New Form of Titanium Dioxide and the Potassium Octatitanate K$_2$Ti$_8$O$_{17}$"; Mat. Res. Bull., 1980, vol. 15, No. 8, pp. 1129-1133.

U.S. Appl. No. 13/537,890, filed Jun. 29, 2012, Harada, et al.
International Preliminary Report on Patentability and Written Opinion issued Dec. 12, 2011 in PCT/JP2009/059080 filed on May 15, 2009.
Office Action issued Feb. 21, 2012, in Japanese Patent Application No. 2011-513199 with English translation.

\* cited by examiner

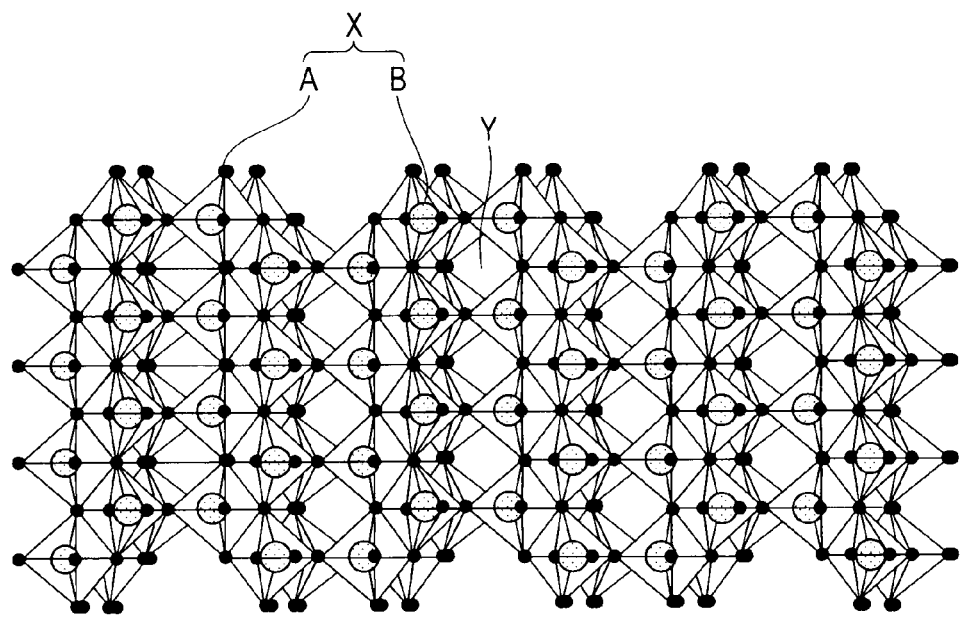
F I G. 1
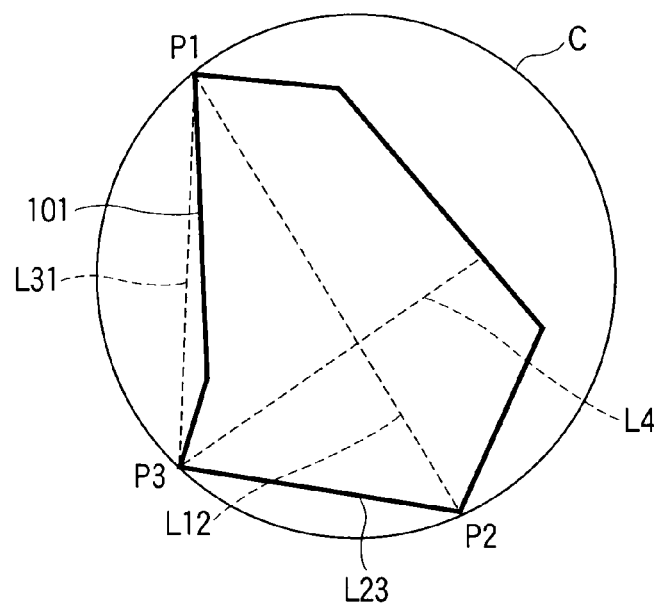
F I G. 2

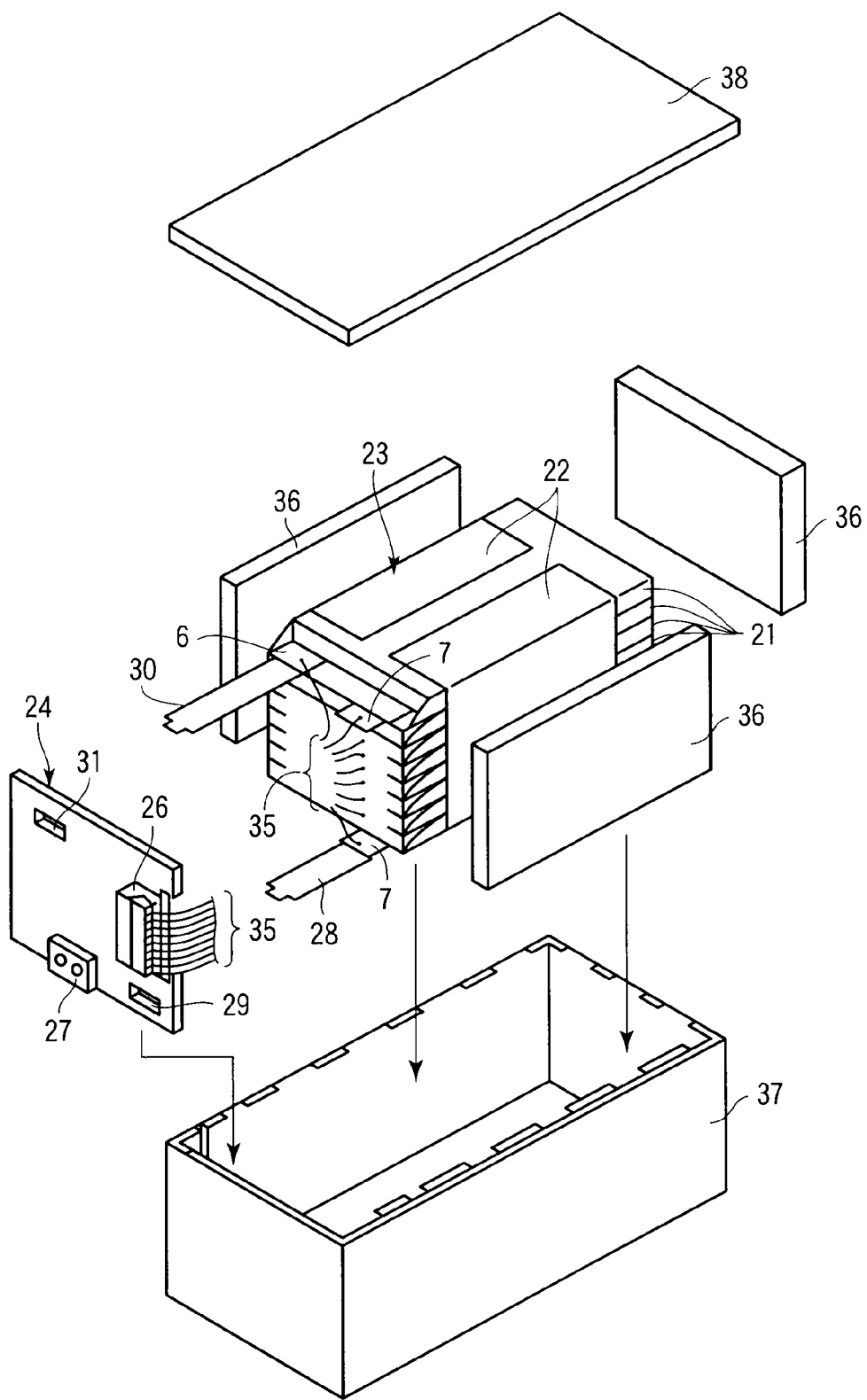
F I G. 7

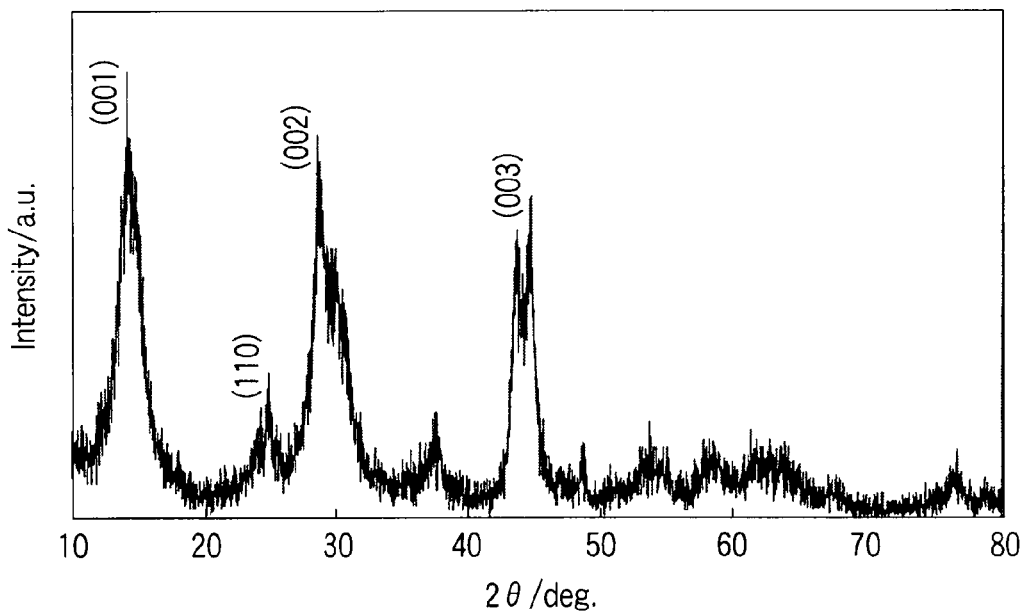
F I G. 12
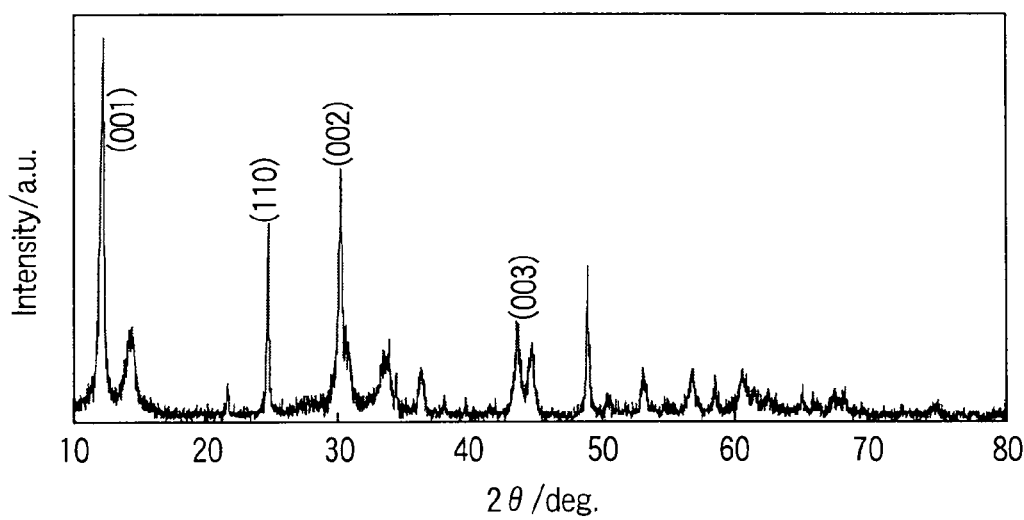
F I G. 13

NEGATIVE ELECTRODE ACTIVE MATERIAL, NONAQUEOUS ELECTROLYTE BATTERY AND BATTERY PACK

CROSS-REFERENCE TO RELATED APPLICATIONS

This application is a Continuation Application of PCT Application No. PCT/JP2009/059080, filed May 15, 2009, the entire contents of which are incorporated herein by reference.

FIELD

Embodiments described herein relate generally to a negative electrode active material, a nonaqueous electrolyte battery, and a battery pack.

BACKGROUND

Monoclinic titanium dioxide is disclosed in R. Marchand, L. Brohan, M. Tournoux, Material Research Bulletin 15, 1129 (1980). Further, JP-A 2008-34368 (KOKAI) discloses a lithium ion secondary battery using titanium oxide $TiO_2$ having a bronze type structure. JP-A 2008-117625 (KOKAI) discloses a lithium secondary battery using titanium dioxide having a crystal structure of bronze titanate type of which the highest intensity peak is a peak of a (110) plane.

WO2009/028553 A1 discloses a titanium oxide compound of which the highest intensity peak is a peak of a (003) plane, and a half-width (2θ) of the highest intensity peak is 0.4 degree. Therefore, a reversible charge-discharge capacity is lowered.

A battery capacity of each of JP-A 2008-34368 (KOKAI), JP-A 2008-117625 (KOKAI) and WO2009/028553 A1 is considerably lower than about 330 mAh/g which is a theoretical capacity in the case of using monoclinic titanium dioxide for an active material. Further, a practical capacity of spinel type lithium titanate is 170 mAh/g, and, as compared to the spinel type lithium titanate, it is difficult to greatly improve the capacity by using the titanium dioxide described in JP-A 2008-34368 (KOKAI) and JP-A 2008-117625 (KOKAI), and WO2009/028553 A1 as the active material.

BRIEF DESCRIPTION OF THE DRAWINGS

FIG. 1 is a diagram schematically showing a layered crystal structure of $TiO_2(B)$ according to a first embodiment;

FIG. 2 is a diagram schematically illustrating an aspect ratio calculation method;

FIG. 7 is an exploded perspective view showing a battery pack according to a third embodiment;

FIG. 12 is a diagram showing an X-ray diffraction of a titanium dioxide powder of Example 4;

FIG. 13 is a diagram showing an X-ray diffraction of a titanium dioxide powder of Comparative Example 1;

DETAILED DESCRIPTION

Figure 3:
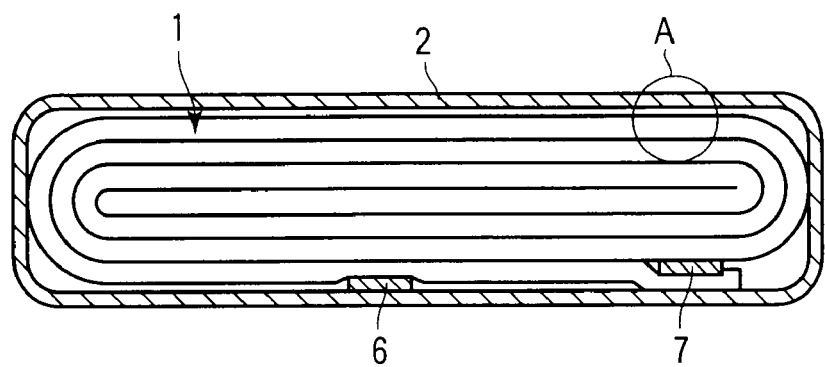
FIG. 3 is a sectional view showing a nonaqueous electrolyte battery according to a second embodiment.

In general, according to one embodiment, a negative electrode active material includes a compound having a crystal structure of monoclinic titanium dioxide. The compound has a highest intensity peak which is detected by X-ray powder diffractometry using a Cu-Kα radiation source. The highest intensity peak is a peak of a (001) plane, (002) plane, or (003) plane. A half-width (2θ) of the highest intensity peak falls within a range of 0.5 degree to 4 degrees. Hereinafter, the compound is referred to as titanium oxide compound.

The embodiments will be described with reference to the drawings. An identical reference numeral is given to components which are common to the embodiments, and an overlapping description is not repeated. Further, the diagrams are not more than those which are schematically drawn for the purpose of illustration and understanding of the embodiments. Shapes, dimensions, ratios, and the like in the diagrams may partially differ from actual devices, and designs thereof can appropriately be changed by taking the following descriptions and well-known technologies into consideration.

First Embodiment

As used herein, the crystal structure of monoclinic titanium dioxide means those represented by a space group C2/m and described in R. Marchand, L. Brohan, M. Tournoux, Material Research Bulletin 15, 1129 (1980). Hereinafter, the crystal structure of monoclinic titanium dioxide is referred to as $TiO_2(B)$. The crystal structure of monoclinic titanium dioxide includes the case in which a lithium ion is contained in the crystal structure.

Shown in FIG. 1 is a diagram schematically showing a projection of the (001) plane in the layered crystal structure of $TiO_2(B)$. An oxide ion A is positioned at an apex of an octahedron shown in FIG. 1, and a titanium ion B is positioned at a central part of the octahedron. Skeletal structures X each of which is formed of the titanium ion B and the oxide ion A are alternately disposed to form a tunneling structure. Further, a clearance Y in the skeletal structures X is a space serving as a host for a lithium ion. In the titanium oxide compound, a site which is capable of absorption and release of the lithium ion can exist on a crystal surface. Therefore, the titanium oxide compound has a property of being capable of intercalation (insertion) of the lithium ion into the clearance Y and allowing adsorption/release of the lithium ion on the crystal surface. Further, the compound is capable of insertion and adsorption of many foreign atoms, organic compounds, and the like other than the lithium ion.

When $Li^+$ is intercalated into the tunnel-like clearances which are observed on the (001) plane, $Ti^{4+}$ forming the skeleton is reduced to $Ti^{3+}$ to make it possible to maintain electrical neutrality of the crystal. Therefore, since $TiO_2(B)$ has one $Ti^{4+}$ per unit lattice, it is possible to newly insert one $Li^+$ at the maximum between layers. Accordingly, a composition of the titanium oxide compound is represented by $Li_xTiO_2$ (provided that a value of x is changeable within a range of $0 \leq x \leq 1$ by charge-discharge). Thus, the titanium oxide compound has a theoretical capacity of about 335 mAh/g which is about twice as much as the known titanium oxide. As for a capacity per unit weight of a titanium compound, a spinel type lithium titanate such as $Li_4Ti_5O_{12}$ has a theoretical capacity of about 175 mAh/g. Further, the number of lithium ions per one mole, which is capable of insertion/desorption of the spinel type lithium titanate $Li_4Ti_5O_{12}$, is three. Therefore, the number of lithium ions which is capable of insertion/desorption per titanium ion is 3/5, and the theoretical maximum number of lithium ions which is capable of insertion/desorption per titanium ion is 0.6.

Symmetry of space groups in $TiO_2(B)$ may be varied due to a distortion caused by an intercalation amount and a type thereof. It is suggested that crystal grains are oriented toward the (001) plane in a compound having $TiO_2(B)$ crystal structure since the highest intensity peak detected by the X-ray powder diffractometry using Cu-Kα radiation source of the compound is the peak of the (001) plane, (002) plane, or (003) plane. In the compound, since many (001) planes having the tunneling structure are exposed, it is considered that the movement of lithium ions is made smoother. As a result, it is possible to improve an effective electrode capacity and a repetitive charge-discharge performance.

Further, the half-width (2θ) of the highest intensity peak is within a range of 0.5 degree to 4 degrees. The half-width of the peak includes information such as crystallinity and a crystallite size of the grains and has a correlation with a performance of the negative electrode containing the titanium oxide compound. When the half-width of the peak is less than 0.5 degree, the performance of the negative electrode is undesirably deteriorated. The deterioration is caused by excessive desorption of crystal water despite the improvement in crystallinity of $TiO_2(B)$. As a result of the excessive desorption of crystal water, the crystallite size is increased, and an interplanar spacing is decreased, thereby reducing the reversible charge-discharge capacity. In contrast, when the peak half-width (2θ) is larger than 4 degrees, the crystallinity is considerably deteriorated to undesirably cause a decrease in electrode capacity performance and a prominent decrease in cycle life performance. Since it is possible to expose many crystal planes in which the lithium ion desorption/insertion is easy by keeping the half-width (2θ) to 0.5 degree or more and 4 degrees or less, it is possible to improve diffusion of lithium ions, thereby making it possible to increase the effective electrode capacity to a reduce a difference from the theoretical value as well as to improve the charge-discharge cycle performance. A more preferred range of the half-width (2θ) may be from 0.6 degree or more to 2 degrees or less.

While improving the effective electrode capacity and charge-discharge cycle performance, the above-described titanium oxide compound is capable of maintaining an electrode potential to about 1.5 V based on a metal lithium, i.e., to an electrode potential attained by spinel type lithium titanate. Therefore, it is possible to realize a nonaqueous electrolyte battery and a battery pack which has a high energy density and an excellent cycle performance, and is capable of stably conducting rapid charge-discharge.

In the X-ray powder diffraction measurement using Cu-Kα radiation, when $TiO_2(B)$ is oriented to the (001) plane, peak intensity at Miller indices of which orientation is the same as the orientation of a reflection plane of the (001) plane is high. More specifically, it is possible to detect the orientation since the peak intensities corresponding to the (001) plane which appears in the vicinity of 2θ=14.25°, the (002) plane which appears in the vicinity of 2θ=28.68°, and the (003) plane which appears in the vicinity of 2θ=43.63° are higher than those of other Miller indices. In view of the fact that the (110) plane which appears near 2θ=25° is observed as the highest intensity peak in the titanium dioxide described in ASTM card (No. 35-0088) which is the index of X-ray powder diffraction pattern and R. Marchand, L. Brohan, M. Tournoux, Material Research Bulletin 15, 1129 (1980) and JP-A 2008-117625 (KOKAI), the orientation is not directed toward the (001) plane.

It is desirable that the titanium oxide compound satisfies the following expression (1):

$$I(110)/I(00Z) \leq 1 \qquad (1),$$

provided that I(00Z) represents intensity of a highest intensity peak, and I(110) represents a peak intensity of the (110) plane in the X-ray powder diffractometry.

The above-described performance improvement effect due to the grains oriented in the direction of the (001) plane is prominently exhibited when the peak intensity ratio of the expression (1) is kept to one or less. Further, when the complete orientation to the (001) plane is attained, the peak intensity ratio substantially becomes zero. The peak intensity ratio of zero is not observed in most cases of crystal grains such as polycrystals, but the intensity ratio can be zero in a thin film of which orientation is controlled on a special substrate. Further, since it is easier to attain the effect of the (001) plane orientation with the use of the thin film, the thin film can be one of preferred modes.

Hereinafter, a measurement method employing X-ray powder diffractometry using Cu-Kα radiation will be described. A sample is pulverized until an average particle diameter becomes about 10 μm. After that, a holder portion having a depth of 0.2 mm in a glass test plate is filled with the sample, and the sample is flattened for a measurement by sufficiently pressing a glass plate to the sample from the outside with fingers. It is necessary to make sure that the measurement sample is sufficiently filled at the holder portion, and it is necessary to pay attention not to overlook filling deficiency of the sample, such as a crack and a clearance. Further, the sample should be filled to be equal to the depth (0.2 mm) of the glass holder, and it is necessary to pay attention not to allow unevenness from the reference surface of the glass holder which can be caused by an excessive/insufficient filling amount. Examples of a more preferred method include the following methods. In order to eliminate a shift of a diffraction peak position or a change in intensity ratio which can be caused when the sample is filled in the glass sample plate, compacted pellets each having a diameter of 10 mm and a thickness of 2 mm are obtained by applying a pressure of about 250 MPa for 15 minutes, and the surface of the pellet is measured.

Further, in the case of performing an X-ray powder diffraction measurement of a titanium oxide compound using Cu-Kα radiation, it is possible to measure an electrode containing the titanium oxide compound instead of the measurement of the powder of the compound. For example, an electrode is produced by preparing a slurry by suspending a powder of the titanium oxide compound, a binder, and a conduction agent into a widely-used solvent, coating the slurry on a current collector, drying to form an electrode layer, and pressing. It is possible to determine an orientation and a highest intensity peak by subjecting the obtained electrode to the X-ray diffraction measurement. More specifically, diffraction peaks attributable to the current collector and added components such as the conduction agent are eliminated from a measurement result to extract only a diffraction peak corresponding to $TiO_2(B)$, and an intensity relationship is investigated to detect the orientation of the (001) plane and the highest intensity peak. With the measurement method, since the degree of orientation is increased by the pressing in the case where $TiO_2(B)$ has orientation on a specific crystal plane, while the measurement result has no influence in the case where $TiO_2(B)$ does not have orientation, the measurement method is preferred in terms of the orientation detection.

It is possible to estimate a width of the peak at a position corresponding to an intensity value which is a half of the highest intensity peak value as a half-width (2θ) (FWHM).

Though an average particle diameter of the titanium oxide compound is not particularly limited, it is desirable to include a crystal having an aspect ratio within a range of 1 to 50, a short axis of 0.1 μm or more and 50 μm or less, and a long axis of 0.1 μm or more and 200 μm or less. These ratios can be changed depending on required battery properties. For example, in the case where rapid charge-discharge is required, it is desirable since it is possible to reduce a diffusion distance of the lithium ion in the crystal by setting the aspect ratio to one and the long and short axes to 0.1 μm. In the case where a high capacity is required, it is possible to intentionally increase a plane in a longitudinal direction of the crystal, i.e., the (001) plane which is the orientation plane, in the pressed electrode by setting the aspect ratio to 10 or more, the short axis to 5 μm, and the long axis to 50 μm or more and 200 μm or less, thereby making it possible to form an electrode having many crystal planes which are advantageous for lithium absorption and release. It is possible to reduce a contact area between the electrode and the electrolytic solution as well as to enhance crystallinity by setting the short and long axes to 0.1 μm or more. Further, by using a long crystal axis of which is 200 μm or less, it is possible to attain good dispersibility of the negative active material into the solvent, thereby improving stability of the slurry.

In the case of aspect ratio measurement of a powder, it is possible to employ a measurement using a laser diffractometer. For example, after observing a shape of particles by using an electron microscope or the like, a particle distribution is measured by using the laser diffractometer. When it is revealed by the electron microscope observation that the powder is of uniform particles and has a high aspect ratio, a peak of a particle distribution corresponding to the short axis of the particles and a peak of the particle distribution corresponding to the long axis of the particles appear in the particle distribution detected by the laser diffractometer, and, therefore, it is possible to consider a ratio between the peaks as an average particle distribution. In other cases, it is possible to obtain the aspect ratio by measuring lengths of short axes and long axes of particles by electron microscope observation.

It is possible to determine the long axis of a particle as described below. In observation of a section of an electrode by using an electron microscope, the smallest circle (hereinafter referred to as smallest circumcircle) among circles enclosing particles (i.e., circumcircles) is drawn. A line between two contact points and having a maximum length is the long axis. The contact point is one between the smallest circumcircle and an outline of the particle.

The determination of the long axis will be described with reference to FIG. 2. A circle C is the smallest circumcircle of a scale shape particle 101. The circle C contacts an outline of the particle 101 at points P1 to P3. In the case where lengths of lines obtained by connecting point P1 to point P2, point P2 to point P3, and point P3 to point P1 are L12, L23, and L31, respectively, the longest line is L12. Therefore, the long axis of the particle 101 shown in FIG. 2 is line L12.

The aspect ratio can be determined as described below. After determining the long axis by the above-described method, a line having a maximum length among straight lines which are perpendicular to the long axis and partitioned by the outline of the particle is the short axis.

When the short and long axes are determined as described above, the aspect ratio is obtained by the following expression:

Aspect ratio=(long axis)/(short axis).

In FIG. 2, the long axis is L12, and the short axis is L4. Therefore, it is possible to detect the aspect ratio as L12/L4. It is possible to obtain the aspect ratio by measuring the aspect ratio obtained as described above on each of a plurality of points (e.g., 100 points or more) within a field of view of an electron microscopic picture and obtaining an average of the aspect ratios.

A BET specific surface area of the titanium oxide compound may preferably be 5 $m^2/g$ or more and 100 $m^2/g$ or less without particular limitation thereto. Since it is possible to ensure a required contact area with the nonaqueous electrolyte by keeping the specific surface area 5 $m^2/g$ or more, it is possible to enhance the battery performance. Further, since it is possible to attain good application performance of the slurry to be used for the electrode production as well as to suppress reactivity between the nonaqueous electrolyte and the negative electrode active material by keeping the specific surface area 100 $m^2/g$ or less, it is possible to improve a cycle life performance.

For analysis of the specific surface area, a method of causing molecules each of which an area to be occupied by its adsorption is detected to be adsorbed on surfaces of particles at a temperature of liquid nitrogen and obtaining a specific surface area of the particles from an amount of adsorbed molecules is employed. The most widely employed method is the BET method utilizing low temperature low humidity physical adsorption of an inert gas, which is obtained by expanding the Langmuir theory which is a monomolecular layer adsorption theory to multilayer adsorption and is the most famous theory as a specific surface area calculation method. The specific surface area obtained by the theory is called BET specific surface area.

When a $TiO_2(B)$ crystal having an orientation to the (001) plane is synthesized by increasing the baking temperature or baking time, anatase type titanium dioxide which is more thermally stable than $TiO_2(B)$ tends to be generated, and many impurity phases corresponding to polymorphism of titanium oxide are contained, which are problematic. The impurity phase is a phase which is a polymorphism phase, in other words, is a phase which has an identical composition and a different crystal shape and a phase which contains same kinds of elements but deviates from a stoichiometric ratio. Further, a crystal lattice is contracted due to excessive desorption of crystal water in $TiO_2(B)$ to reduce the peak half-width (2θ) to less than 0.5 degree, resulting in deterioration of lithium ion diffusion property in a solid matter, whereby the effect by the orientation to the (001) plane is not exhibited.

The inventors have synthesized an alkali titanate compound such as potassium titanate ($K_2Ti_4O_9$), sodium titanate ($Na_2Ti_3O_7$), and cesium titanate ($Cs_2Ti_5O_{12}$) by using a fusion method of fusing at 900 to 1500° C. and crystallizing by cooling, a flux method of using $K_2MoO_4$, $K_2WO_4$, or the like as a flux, or a hydrothermal synthesis for synthesizing the alkali titanate compound at 100 to 500° C. and 10 to 1000 atm with using $TiO_2$ and an alkali solution in which KOH or the like is dissolved. As a result, the inventors have managed to impart anisotropy to a crystal growth rate of the alkali titanate compound and have succeeded in synthesizing a raw material crystal of which the (001) plane orientation is easily achieved. The obtained alkali titanate compound is subjected to proton exchange process to synthesize titanate ($H_2Ti_4O_9$ or the like) which is a precursor of $TiO_2(B)$, and then the titanate is subjected to low-temperature and short-time heating to synthesize $TiO_2(B)$. The inventors have found that it is possible to control the half-width ($2\theta$) of the highest intensity peak within a range of 0.5 degree to 4 degrees while attaining the (001) plane orientation by the above-described synthesizing method. Since it is possible to perform the synthesis under conditions which do not cause the impurity phase and lattice contraction according to the method, the lithium ion desorption/insertion is facilitated by the effect of the (001) plane orientation, thereby making it possible to provide a negative electrode active material having a high capacity of 240 mAh/g or more which is 70% or more of the theoretical capacity. A commercially available reagent of the alkali titanate compound which is synthesized by a method similar to the above-described method may be used as a starting material.

In the above-described fusion method, anisotropic crystal growth is attained by mixing a raw material oxide, a carbonate, and the like at stoichiometric ratio, fusing at a temperature equal to or higher than a melting point, and solidification by cooling. Here, it is preferable to conduct the fusing by appropriately adding a known flux material. It is possible to control a growth rate of a target crystal plane by changing the type of flux material.

The flux method enables to control a crystal growth axis by using $K_2MoO_4$, $K_2WO_4$, or the like as a flux species.

The above-described method of obtaining the alkali titanate compound of which a specific crystal plane is oriented through the hydrothermal synthesis will be described. To start with, a titanium alkoxide solution is prepared by diluting titanium alkoxide with a solvent. Titanium tetraisopropoxide may be used as the titanium alkoxide. Ethanol or 2-propanol may be used as the solvent. The titanium alkoxide is gelled through hydrolysis by adding a dropping of a solution (ethanol concentration: 20 to 50 wt %) obtained by mixing pure water and ethanol to the titanium alkoxide mixed with the solvent, and then the titanium alkoxide is heated at 400 to 600° C. to obtain titanium oxide particles. Next, the obtained titanium oxide particles are dispersed into an alkali solution, followed by a hydrothermal treatment. The hydrothermal treatment may be performed by a known method. As the alkali solution, a sodium hydroxide solution, a lithium hydroxide solution, or a potassium hydroxide solution may be used. The titanium oxide particles dispersed into alkali are subjected to hydrothermal synthesis by pressurizing and heating using an autoclave pressurizing vessel, i.e., at high temperature and high pressure (e.g., 100 to 500° C., 10 to 1000 atm). Here, since the alkali titanate compound having at least one of a nanotube structure and a nanowire structure in which a specific crystal plane is grown is generated, it is possible to synthesize $TiO_2(B)$ which has the (001) orientation in the same manner as in the fusion method.

In order to remove impurities from a powder of the raw material alkali titanate compound synthesized by the fusion method, flux method, and hydrothermal method, the powder is washed well with distilled water and subjected to an acid treatment, and then alkali cations are exchanged with protons. It is possible to perform the proton exchange of each of potassium ion contained in potassium titanate, sodium ion contained in sodium titanate, and cesium ion contained in cesium titanate without breaking the crystal structures. The proton exchange by acid treatment is performed by adding hydrochloric acid, nitric acid, or sulfuric acid having a concentration of 0.5 to 2 M to the powder, followed by stirring. It is desirable to keep the acid treatment performed until the proton exchange is satisfactorily completed. It is necessary to pay attention not to remain potassium, sodium, or the like contained in the raw material, since the remaining potassium or the like results in a reduction of charge-discharge capacity. The acid treatment may desirably be performed at room temperature of about 25° C. without particular limitation thereto and for 24 hours or more in the case where hydrochloric acid having a concentration of about 1M is used. More preferably, the acid treatment is performed for 1 to 2 weeks. Further, in order to perform the proton exchange without fail, it is desirable to change the acid solution with new one every 24 hours. In order to neutralize the residual acid in the proton exchange, an alkali solution such as a lithium hydroxide solution may be added. After completion of the proton exchange, washing well with distilled water is performed again to make a pH of the washing water to be settled within a range of 6 to 8. By washing the product after the proton exchange with water and drying, a proton titanate compound which is an intermediate product (precursor) is obtained.

Next, a titanium oxide compound which is the final target product is obtained by subjecting the proton titanate compound which is the intermediate product (precursor) synthesized by the above-described methods to a heat treatment. An optimum temperature in the heat treatment of the proton titanate compound is varied depending on a raw material composition, a particle diameter, a crystal shape, and the like of the proton titanate compound. It is possible to synthesize the titanium oxide compound having a high capacity by controlling heating temperature and time when any one of the raw materials is used. The heating temperature is within a range of 300 to 500° C., and a range of 350 to 400° C. is particularly preferred for maintaining the (001) plane orientation. When the heating temperature is less than 300° C., crystallinity is considerably deteriorated, and an electrode capacity, charge-discharge efficiency, a repetition performance are undesirably deteriorated. When the heating temperature exceeds 500° C., rearrangement of atoms in the crystal is promoted, which not only deteriorates the (001) orientation of $TiO_2(B)$, but also generates anatase type titanium dioxide as an impurity phase, resulting in undesirable deterioration of electrode performance.

In the known synthetic methods described in R. Marchand, L. Brohan, M. Tournoux, Material Research Bulletin 15, 1129 (1980) and JP-A 2008-117625 (KOKAI), since the isotropic raw material which is synthesized by a solid phase reaction is used, it is difficult to expose the (001) plane having the tunneling structure which is advantageous for the lithium desorption/insertion in the electrode. Therefore, it is considered that the electrode capacity is suppressed to 160 to 200 mAh/g or less than this, and the negative electrode active material containing the titanium oxide compound in which more (001) planes are exposed is advantageous for stably providing the high electrode capacity.

According to the first embodiment, it is possible to provide a negative electrode material, which has a high initial discharge capacity and an excellent charge-discharge cycle performance.

Second Embodiment

A nonaqueous electrolyte battery according to the second embodiment includes a positive electrode, a negative electrode containing the negative electrode active material according to the first embodiment, a nonaqueous electrolyte, a separator, and a jacket member.

Hereinafter, the positive electrode, the negative electrode, the nonaqueous electrolyte, the separator, and the jacket member will be described in detail.

The positive electrode includes a current collector and a layer (positive electrode active material-containing layer) provided on one or both of surfaces of the current collector and containing a positive electrode active material and a binder.

Examples of the positive electrode active material include an oxide, a sulfide, and the like. Specific examples thereof include manganese dioxide ($MnO_2$) capable of absorbing lithium, iron oxide, copper oxide, nickel oxide, lithium manganese composite oxide (e.g., $Li_xMn_2O_4$ or $Li_xMnO_2$), lithium nickel composite oxide (e.g., $Li_xNiO_2$), lithium cobalt composite oxide (e.g., $Li_xCoO_2$), lithium nickel cobalt composite oxide (e.g., $LiNi_{1-y}Co_yO_2$), lithium manganese cobalt composite oxide (e.g., $Li_xMn_yCo_{1-y}O_2$), spinel type lithium manganese nickel composite oxide ($Li_xMn_{2-y}Ni_yO_4$), lithium phosphor oxide having an olivine structure (e.g., $Li_xFePO_4$, $Li_xFe_{1-y}Mn_yPO_4$, $Li_xCoPO_4$), iron sulfate ($Fe_2(SO_4)_3$), vanadium oxide (e.g., $V_2O_5$), lithium nickel cobalt manganese composite oxide, and the like. Here, each of x and y is within a range of 0 to 1.

Examples of the positive electrode active material which enables to obtain a high positive electrode potential include lithium manganese composite oxide ($Li_xMn_2O_4$), lithium nickel composite oxide ($Li_xNiO_2$), lithium cobalt composite oxide ($LixCoO_2$), lithium nickel cobalt composite oxide ($LiNi_{1-y}Co_yO_2$), spinel type lithium manganese nickel composite oxide (e.g., $Li_xMn_{2-y}Ni_yO_4$), lithium manganese cobalt composite oxide ($Li_xMn_yCo_{1-y}O_2$), lithium iron phosphate ($Li_xFePO_4$), lithium nickel cobalt manganese composite oxide, and the like. Here, each of x and y is within a range of 0 to 1.

Among the above, it is preferable to use lithium iron phosphate, $Li_xVPO_4F$, lithium manganese composite oxide, lithium nickel composite oxide, lithium nickel cobalt composite oxide, or the like in the case of using a nonaqueous electrolyte containing an ionic liquid from the viewpoint of cycle life. With the use of such active material, it is possible to reduce reactivity between the positive active material and the ionic liquid. A primary particle diameter of the positive electrode active material may preferably be 100 nm or more and 1 μm or less. The positive electrode active material having the primary particle diameter of 100 nm or more enables easy handling in terms of industrial production. The positive electrode active material having the primary particle diameter of 1 μm or less enables to smoothly diffuse lithium ions into a solid matter.

A specific surface area of the positive electrode active material may preferably be 0.1 $m^2/g$ or more and 10 $m^2/g$ or less. The positive electrode active material having the specific surface area of 0.1 $m^2/g$ or more enables to ensure sufficient absorption/desorption sites for lithium ions. The positive electrode active material having the specific surface area of 10 $m^2/g$ or less enables easy handling in terms of industrial production and enables to ensure a good charge-discharge cycle performance.

Examples of the binder which is used for the purpose of binding the positive electrode active material with the current collector include polytetrafluoroethylene (PTFE), polyvinylidene fluoride (PVdF), a fluorine-based rubber, and the like.

A conductive agent may be added as required in order to enhance a current collection performance and to suppress contact resistance with the current collector. Examples of the conductive agent include a carbonaceous material such as acetylene black, carbon black, and graphite.

As proportions of the positive electrode active material and the binder, the positive electrode active material may preferably be within a range of 80 wt % or more to 98 wt % or less, and the binder may preferably be within a range of 2 wt % or more to 20 wt % or less. It is possible to attain sufficient electrode strength by keeping the amount of the binder to 2 wt % or more, and it is possible to reduce a content of an insulator in the electrode and to reduce internal resistance by keeping the amount of the binder to 20 wt % or less.

In the case of adding the conductive agent, it is possible to attain the above-described conductive agent addition effect by keeping an amount thereof to 3 wt % or more, and it is possible to reduce decomposition of the nonaqueous electrolyte on surfaces of the positive electrode conductive agent under high-temperature storage by keeping the amount thereof to 15 wt % or less.

The positive electrode is produced by preparing a slurry by suspending the positive electrode active material, the binder, and the conductive agent as required into an appropriate solvent, coating the slurry on the positive electrode current collector, drying to form the positive electrode active material-containing layer, and pressing, for example.

In the manufacture of the positive electrode, a positive electrode active material-containing layer which is produced by mixing the positive electrode active material, the binder, and the conductive agent as required may be used, and followed by molding the mixture into a pellet.

The positive electrode current collector may preferably be an aluminum foil or an aluminum alloy foil.

A thickness of the aluminum foil or the aluminum alloy foil may preferably be 5 μm or more and 20 μm or less, more preferably 15 μm or less. The aluminum foil may preferably have a purity of 99 wt % or more. The aluminum alloy may be an alloy containing an element such as magnesium, zinc, silicon, and the like. A content of a transition metal which can be contained in the aluminum foil or the aluminum alloy foil may preferably be 1 wt % or less. Examples of the transition metal include iron, copper, nickel, and chromium.

The negative electrode includes a negative electrode current collector and a layer (negative electrode active material-containing layer) provided on one or both of surfaces of the current collector and containing a negative electrode active material, a conductive agent, and a binder. In the layer, the binder fills clearances of the dispersed negative electrode active material, and the conductive agent is added for the purpose of enhancing a current collector performance and suppressing contact resistance with the current collector.

Examples of the negative electrode active material include the titanium oxide compound used in the first embodiment.

The titanium oxide compound may be used alone as the negative electrode active material or may be used in combination with other negative electrode active materials. Preferred examples of the other negative electrode active materials include anatase type titanium dioxide ($TiO_2$), $Li_2Ti_3O_7$ which is ramsdellite type lithium titanate, $Li_4Ti_5O_{12}$ which is spinel type lithium titanate, since they have a similar specific weight and are well mixed and dispersed.

A content of the negative electrode active material in the layer may be 70 wt % or more and 98 wt % or less.

Examples of the conductive agent include a carbonaceous material such as acetylene black, carbon black, graphite, carbon nanotube, and carbon nanofiber.

Examples of the binder include polytetrafluoroethylene (PTFE), polyvinylidene fluoride (PVdF), a fluorine-based rubber, a styrene-butadiene rubber, and the like.

The binder may preferably be mixed in the layer in an amount of 2 wt % or more and 30 wt % or less. When the amount of the binder is 2 wt % or more, an excellent cycle performance is expected since satisfactory binding between the layer and the current collector is attained. In contrast, from the viewpoint of high capacity, the amount of the binder may preferably be 30 wt % or less. Further, a proportion of the conductive agent in the layer may preferably be 30 wt % or less.

For the current collector, a material which is electrochemically stable at a lithium absorption/release potential of the negative electrode active material is used. The current collector may preferably be made from copper, nickel, stainless steel, or aluminum. A thickness of the current collector may preferably be 5 to 20 μm. The current collector having the above-specified thickness is capable of keeping a balance between strength and light weight of the negative electrode.

The negative electrode is produced by preparing a slurry by suspending the negative electrode active material, the conductive agent, and the binder into a widely-used solvent, coating the slurry on the current collector, drying to form the layer, and pressing, for example.

In the manufacture of the negative electrode, a negative electrode active material-containing layer which is produced by mixing the negative electrode active material, the binder, and the conductive agent may be used, and followed by molding the mixture into a pellet.

Examples of the nonaqueous electrolyte include a liquid nonaqueous electrolyte which is prepared by dissolving an electrolyte into an organic solvent, a gel nonaqueous electrolyte which is a composite of a liquid electrolyte and a polymer material, and the like.

The liquid nonaqueous electrolyte may be prepared by dissolving the electrolyte into the organic solvent at a concentration of 0.5 mol/L or more and 2.5 mol/L or less.

Examples of the electrolyte include lithium salts such as lithium perchlorate ($LiClO_4$), lithium hexafluorophosphate ($LiPF_6$), lithium tetrafluoroborate ($LiBF_4$), lithium hexafluoro arsenate ($LiAsF_6$), lithium trifluoromethasulfonate ($LiCF_3SO_3$), and lithium bis(trifluoromethyl sulfonyl) imide [$LiN(CF_3SO_2)_2$] or mixtures thereof. The electrolyte may preferably be hardly oxidized at a high potential, and $LiPF_6$ is most preferred.

Examples of the organic solvent include a cyclic carbonate such as propylene carbonate (PC), ethylene carbonate (EC), and vinylene carbonate; a chain carbonate such as diethyl carbonate (DEC), dimethyl carbonate (DMC), and methylethyl carbonate (MEC); a cyclic ether such as tetrahydrofuran (THF), 2-methyl tetrahydrofuran (2MeTHF), and dioxolan (DOX); a chain ether such as dimethoxyethane (DME) and diethoxy ethane (DEE); γ-butyrolactone (GBL); acetonitrile (AN); sulfolane (SL); and the like, which may be used alone or in the form of a mixture solvent.

Examples of the polymer material include polyvinylidene fluoride (PVdF), polyacrylonitrile (PAN), polyethylene oxide (PEO), and the like.

As the nonaqueous electrolyte, an ionic liquid containing lithium ion, a polymeric solid electrolyte, an inorganic solid electrolyte, or the like may be used.

The ionic liquid means a compound which can exist as a liquid at an ambient temperature (15 to 25° C.) among organic salts obtained by combining an organic cation and an anion. Examples of the ionic liquid include those existing as a liquid when used alone, those becoming a liquid when mixed with an electrolyte, those becoming a liquid when dissolved into an organic solvent, and the like. A melting point of the ionic liquid which is typically used for the nonaqueous electrolyte battery is 25° C. or less. Further, the organic cation ordinarily has a quaternary ammonium skeleton.

The polymeric solid electrolyte is prepared by dissolving the electrolyte into the polymer material, followed by solidification.

The inorganic solid electrolyte is a solid substance having lithium ion conductivity.

Examples of the separator include a porous film containing polyethylene, polypropylene, cellulose, or polyvinylidene fluoride (PVdF), a nonwoven fabric of a synthetic resin, and the like. Among the above, the porous film containing polyethylene or polypropylene is preferred from the viewpoint of improvement in safety since such a porous film is molten at a certain temperature and blocks a current.

For the jacket member, a laminate film having a thickness of 0.5 mm or less or a metallic container having a thickness of 1 mm or less is used. The thickness of the laminate film may more preferably be 0.2 mm or less. The metallic container may more preferably have a thickness of 0.5 mm or less, further preferably 0.2 mm or less.

Examples of a shape of the jacket member include a flat type (thin type), a square type, a cylinder type, a coin type, a button type, and the like. Depending on battery dimensions, a jacket member for small battery which is mounted to a mobile electronic appliance, a jacket member for a large battery which is mounted on a two- or four-wheel vehicle, and the like may be used.

As the laminate film, a multilayer film in which a metal layer is formed between resin layers is used. The metal layer may preferably be an aluminum foil or an aluminum alloy foil for attaining a light weight. As the resin layer, a polymer material such as polypropylene (PP), polyethylene (PE), nylon, polyethylene terephthalate (PET), and the like may be used. The laminate film may be molded into the shape of the jacket member by sealing by thermal fusion bonding.

The metallic container is made from aluminum, an aluminum alloy, or the like. The aluminum alloy may preferably be an alloy containing an element such as magnesium, zinc, silicon, and the like. A content of a transition metal such as iron, copper, nickel, and chromium in the aluminum or aluminum alloy may preferably be 1 wt % or less. With such content, it is possible to dramatically improve a long-term reliability and a heat discharge performance in a high-temperature environment.

Figure 4:
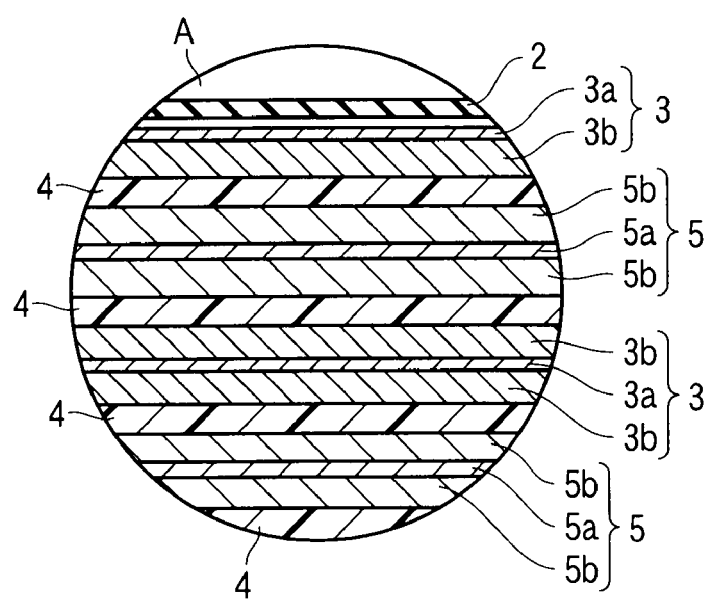
FIG. 4 is an enlarged sectional view showing a part A of FIG. 3.

Hereinafter, the nonaqueous electrolyte battery according to the second embodiment will be more specifically described with reference to FIG. 3 and FIG. 4. FIG. 3 is a sectional view showing the flat nonaqueous electrolyte battery according to the second embodiment, and FIG. 4 is an enlarged view of a part A of FIG. 3.

A flat wound electrode group 1 is housed in a sac-like jacket member 2 made from a laminate film which is obtained by inserting a metal layer into two resin layers. The flat wound electrode group 1 is formed by spirally winding a laminate obtained by laminating a negative electrode 3, a separator 4, a positive electrode 5, and a separator 4 in this order from an outermost layer and press-molding. The negative electrode 3 which serves as the outermost layer has a structure that a layer 3b containing the above-described negative electrode active material according to the first embodiment is formed on an inner surface of a negative electrode current collector 3a as shown in FIG. 4, and the rest of the negative electrodes 3 have a structure that the layer 3b is formed on both surfaces of the negative electrode current collector 3a. The positive electrode 5 has a structure that a layer 5b is formed on both surfaces of a positive electrode current collector 5a.

In the vicinity of an outer periphery of the wound electrode group 1, a negative electrode terminal 6 is electrically connected to the negative electrode current collector 3a of the negative electrode 3 serving as the outermost layer, and a positive electrode terminal 7 is electrically connected to the positive electrode current collector 5a of the inner positive electrode 5. The negative electrode terminal 6 and the positive electrode terminal 7 are extended from an opening of the sac-like jacket member 2 to the outside. For example, the liquid nonaqueous electrolyte is injected through the opening of the sac-like jacket member 2. The wound electrode group 1 and the liquid nonaqueous electrolyte are completely sealed by heat-sealing the opening of the sac-like jacket member 2 with the negative electrode terminal 6 and the positive electrode terminal 7 being inserted into the opening.

The negative electrode terminal may be formed from a material which has electrochemical stability and conductivity at the above-described Li absorption/release potential of the negative electrode active material. Specific examples thereof include copper, nickel, stainless steel, and aluminum. The negative electrode terminal may preferably be a material which is the same as that used for the negative electrode current collector in order to reduce contact resistance.

The positive electrode terminal may be formed from a material which has electrical stability and conductivity when a potential to a lithium ion metal is within a range of 3 to 5 V. Specific examples thereof include aluminum and an aluminum alloy containing an element such as Mg, Ti, Zn, Mn, Fe, Cu, and Si. The positive electrode terminal may preferably be a material which is the same as that used for the positive electrode current collector in order to reduce contact resistance.

Figure 5:
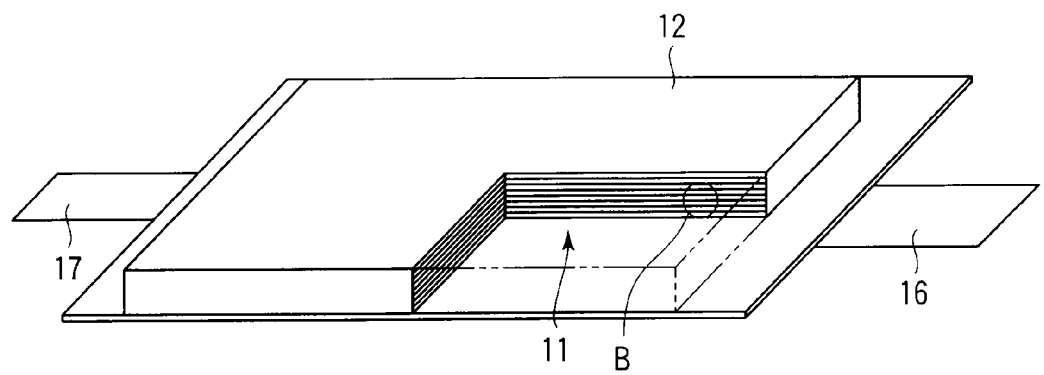
FIG. 5 is an oblique view, partly broken away, schematically showing another nonaqueous electrolyte battery according to the second embodiment.
Figure 6:
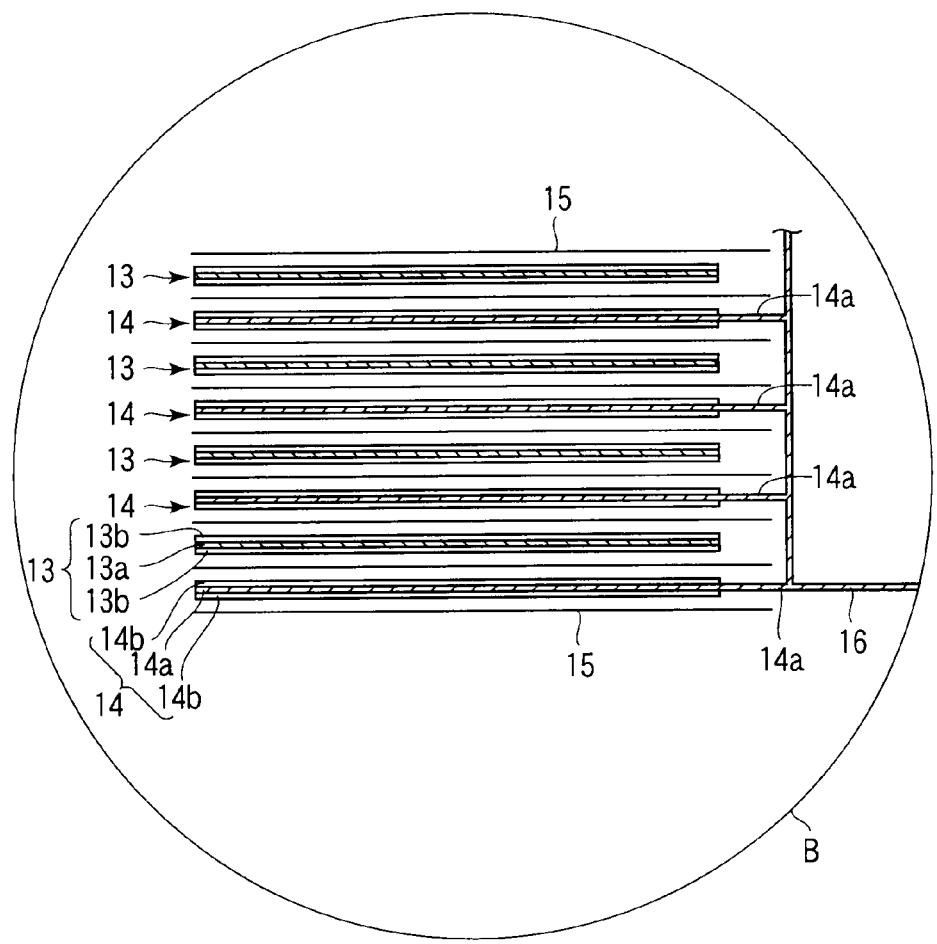
FIG. 6 is an enlarged sectional view showing a part B of FIG. 5.

The nonaqueous electrolyte battery according to the second embodiment may have the structure shown in FIG. 5 and FIG. 6 without limitation to the above-described structure shown in FIG. 3 and FIG. 4. FIG. 5 is an oblique view, partly broken away, schematically showing another nonaqueous electrolyte battery according to the second embodiment, and FIG. 6 is an enlarged sectional view showing a part B of FIG. 5.

A laminate type electrode group 11 is housed in a jacket member 12 made from a laminate film in which a metal layer is formed between two resin layers. The laminate type electrode group 11 has a structure that a positive electrode 13 and a negative electrode 14 are alternately laminated with a separator 15 being disposed therebetween as shown in FIG. 6. There are a plurality of the positive electrodes 13, and each of which includes a current collector 13a and a positive electrode active material-containing layer 13b which is carried on both surfaces of the current collector 13a. There are a plurality of the negative electrodes 14, and each of which includes a current collector 14a and a negative electrode active material-containing layer 14b which is carried on both surfaces of the current collector 14a. One side of the current collector 14a of each of the negative electrode 14 is projected from the positive electrode 13. The projected current collector 14a is electrically connected to a strip-like negative electrode terminal 16. A leading end of the strip-like negative electrode terminal 16 is drawn to the outside from a jacket member 11. Further, though not shown, as for the current collector 13a of the positive electrode 13, a side positioned at an opposite side of the projected side of the current collector 14a is projected from the negative electrode 14. The current collector 13a projected from the negative electrode 14 is electrically connected to a strip-like positive electrode terminal 17. A leading end of the strip-like positive electrode terminal 17 is positioned at an opposite side of the negative electrode terminal 16 and is drawn to the outside from one side of the jacket member 11.

According to the second embodiment as described above, it is possible to provide the nonaqueous electrolyte battery having the high initial discharge capacity and the excellent repetitive charge-discharge performance owing to the negative electrode containing the negative electrode active material described in the first embodiment.

Third Embodiment

The battery pack according to the third embodiment has a plurality of unit cells, in which the unit cells are connected with each other in electrically series or parallel. It is possible that the nonaqueous electrolyte battery is used as the unit cell.

The battery pack will be described in detail with reference to FIG. 7 and FIG. 8. As the cell, the flat battery shown in FIG. 3 is usable.

A plurality of the unit cells 21 each formed of the flat nonaqueous electrolyte battery shown in FIG. 3 are stacked so that a positive electrode terminal 7 and a negative electrode terminal 6 that are extended to outside are aligned in the same direction, and are bound by an adhesive tape 22 to constitute a battery module 23. As shown in FIG. 8, the unit cells 21 are connected electrically in series with each other.

A printed wiring board 24 is disposed opposing to the side surface of the unit cells 21 from which the negative electrode terminal 6 and positive electrode terminal 7 are extended. As shown in FIG. 8, a thermistor 25, a protective circuit 26, and a terminal 27 for carrying a current to an external device are mounted on the printed wiring board 24. In addition, an insulating board (not shown) is attached to the surface of the protective circuit substrate 24, which faces the battery module 23, so as to avoid unnecessary connection with the wiring of the battery module 23.

A positive electrode lead 28 is electrically connected to the positive electrode terminal 7 that is positioned at the lowermost layer of the battery module 23, and the tip thereof is inserted to and electrically connected to a positive electrode connector 29 of the printed wiring board 24. A negative electrode lead 30 is electrically connected to the negative electrode terminal 6 that is positioned at the uppermost layer of the battery module 23, and the tip thereof is inserted to and electrically connected to a negative electrode connector 31 of the printed wiring board 24. These connectors 29 and 31 are connected to a protective circuit 26 via wirings 32 and 33 that are formed on the printed wiring board 24.

The thermistor 25 detects the temperature of the unit cells 21, and the detection signal thereof is sent to the protective circuit 26. The protective circuit 26 may break a plus wiring 34a and a minus wiring 34b between the protective circuit 26 and the terminal 27 for carrying a current to an external device, under a predetermined condition. The predetermined condition refers to, for example, the time at which the detection temperature of the thermistor 25 reaches a predetermined temperature or more. Furthermore, the predetermined condition refers to the time at which over-charge, over-discharge, over-current or the like of the unit cells 21 are detected. The detection of over-charge or the like is performed in the individual unit cells 21 or the entirety of the unit cells 21. When detection is performed in the individual unit cell 21, a battery voltage may be detected, or a positive electrode potential or negative electrode potential may be detected. In the latter case, a lithium electrode that is used as a reference electrode is inserted in the individual unit cell 21. In the case of FIGS. 7 and 8, wirings 35 for detection of a voltage are connected to the respective unit cells 21, and detection signals are sent to the protective circuit 26 via the wirings 35.

Protective sheets 36 made of a rubber or resin are disposed respectively on the three side surfaces of the battery module 23 except for the side surface from which the positive electrode terminal 7 and negative electrode terminal 6 protrude.

The battery module 23 is housed in a housing container 37 together with the respective protective sheets 36 and the printed wiring board 24. Namely, the protective sheets 36 are disposed respectively on the both inner surfaces in the longitudinal side direction and the inner surface in the short side direction of the housing container 37, and the printed wiring board 24 is disposed on the inner surface on the opposite side in the short side direction. The battery module 23 is positioned in a space surrounded by the protective sheets 36 and the printed wiring board 24. A lid 38 is attached to the upper surface of the housing container 37.

Alternatively, the battery module 23 may be fixed by using a heat shrink tape instead of the adhesive tape 22. In this case, the protective sheets are disposed on both side surfaces of the battery module, the battery module is wound around a heat shrink tube, and the heat shrink tube is shrank by heating to bind the battery module.

Figure 8:
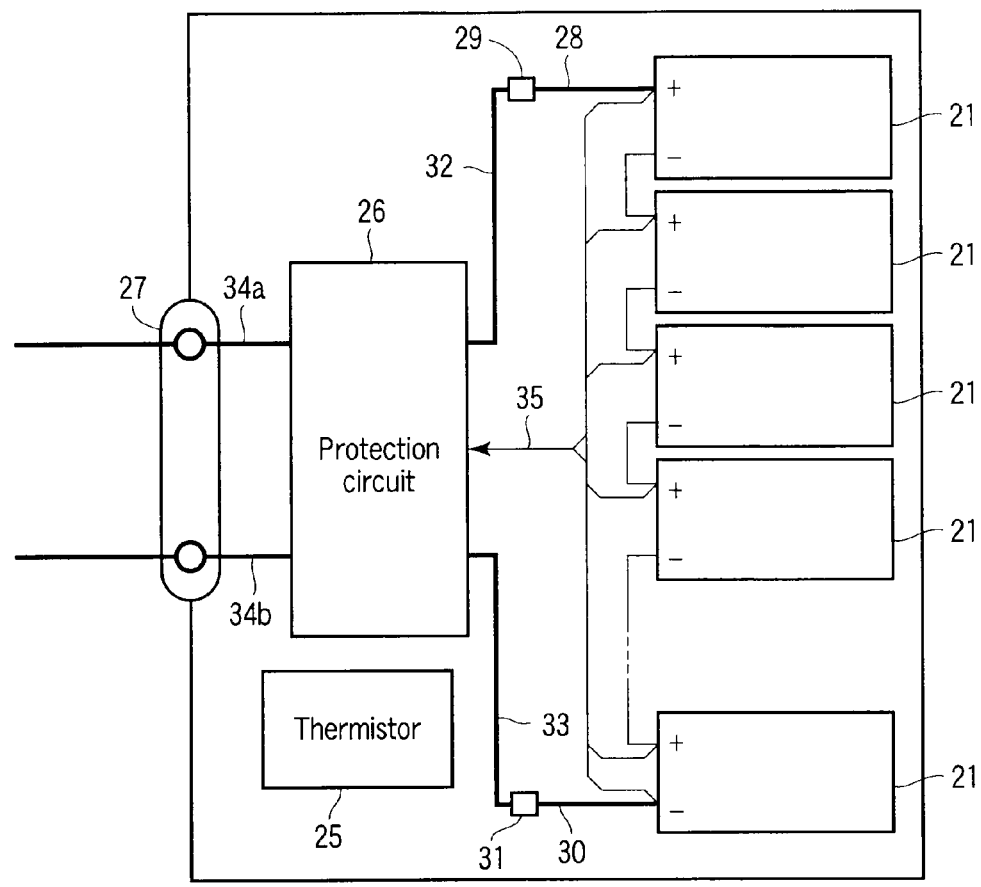
FIG. 8 is a block diagram showing an electric circuit of the battery pack of FIG. 7.

Although an embodiment in which the unit cells 21 are connected with each other in series is shown in FIGS. 7 and 8, the unit cells may be connected with each other in parallel so as to increase a battery capacity. Alternatively, assembled battery packs may be connected with each other in series or parallel.

Furthermore, the embodiment of the battery pack is suitably changed according to use. Preferable use of the battery pack is one for which cycle performance at high currents is desired. Specific examples may include uses in power sources for digital cameras, and in-car uses in two to four-wheeled hybrid battery automobiles, two to four-wheeled battery automobiles, motor assisted bicycles and the like. The use for car is particularly suitable.

EXAMPLES

Hereinafter, a more detailed description will be given based on examples, but the embodiments are not limited only to the examples. Identification of a crystal phase and estimation of a crystal structure obtained by a reaction are conducted by employing an X-ray powder diffractometry using Cu-Kα radiation, and a specific surface area was measured by the BET method mentioned in the first embodiment. Further, a composition of a product was analyzed by employing the ICP method to confirm that a target material was obtained.

Example 1

As one example of an alkali titanate compound to be used as a raw material, potassium titanate represented by $K_2Ti_4O_9$ was synthesized. The synthetic method may preferably be, but is not particularly limited to, a fusing method in order to accelerate crystal growth on a specific plane. As raw materials, potassium carbonate and titanium dioxide were mixed at a composition ratio (an atomic molar ratio) (K:Ti) of 1:2. The mixture was thrown into a platinum furnace and fused by heating to 1000° C.

Next, the fused mixture was taken out of the furnace and quenched by casting onto a cooling plate, thereby accelerating a crystal growth having anisotropy by taking advantage of a difference in crystal growth rate. The obtained solid matter was washed with water to dissolve aggregates while eliminating a part of potassium ions. The obtained $K_2Ti_4O_9$ powder had a crystal size of 20 to 100 μm in the long-axis direction and 1 to 10 μm in the short-axis direction, which was a plate-like crystal. The plate-like crystal maintaining the crystalline form was added to a 1M hydrochloric acid solution and stirred at 25° C. for two weeks. The 1M hydrochloric acid was replaced by new one every 24 hours. Since the obtained suspension had good dispersibility, separation by filtration was difficult. Therefore, separation from the solvent component was conducted by using a centrifugal separator. The obtained proton exchanged $H_2Ti_4O_9$ powder was washed with pure water until a pH of the washing reached 6 to 7.

The obtained intermediate product (precursor) $H_2Ti_4O_9$ was heated under three different conditions of the temperature at 350° C. for one hour (Example 1A), three hours (Example 1B), and six hours (Example 1C). In order to obtain an accurate heat history, each of the samples was placed in an electric furnace which was kept at the predetermined temperature and then quickly taken out of the furnace after being heated, then was quenched in air. The sample was dried in vacuum at 80° C. for 12 hours.

Figure 9:
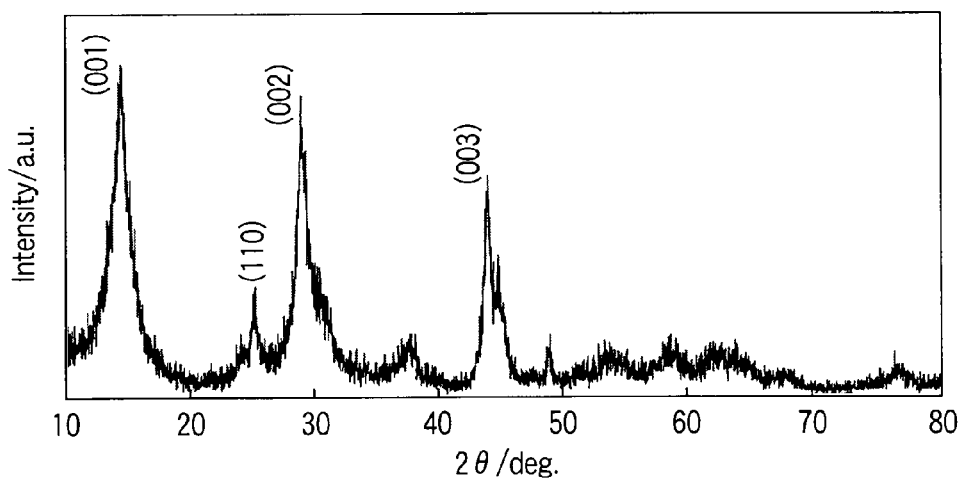
FIG. 9 is a diagram showing an X-ray diffraction of a titanium dioxide powder of Example 1B.

Shown in FIG. 9 is a pattern of X-ray powder diffraction of the powder obtained by Example 1B detected by using Cu-Kα as a radiation source. In the X-ray powder diffraction patterns of FIG. 9 onward, the horizontal axis represents 2θ, and the vertical axis represents intensity. In Examples, for conducting the X ray diffraction measurement, compacted pellets each having a diameter of 10 mm and a thickness of 2 mm were prepared by pulverizing until an average particle diameter reached about 10 μm and then pressurizing with 250 MPa for 15 minutes, and a surface of the pellet was measured. Measurement conditions were: scanning speed of 3 degree/minute; a step width of 0.2 degree; a tube voltage of 40 kV; and a tube current of 20 mA. As shown in FIG. 9, it was confirmed that each of the obtained diffraction patterns was of titanium dioxide belonging to a space group of C2/m and having the monoclinic $TiO_2(B)$ structure. Further, in each of the diffraction patterns, it was confirmed that a (001) plane exhibited the highest peak intensity, and a half-width (2θ) thereof was 1.70 degrees.

Example 2

A $K_2Ti_4O_9$ powder in the obtained crystalline form, which was obtained in the same manner as in Example 1, was added to a 2M hydrochloric acid solution, then stirred at 70° C. for 48 hours. Since the obtained suspension had good dispersibility, separation by filtration was difficult. Therefore, separation from the solvent component was conducted by using a centrifugal separator. The obtained proton exchanged $H_2Ti_4O_9$ powder was washed with pure water until a pH of the washing reached 6 to 7.

Figure 10:
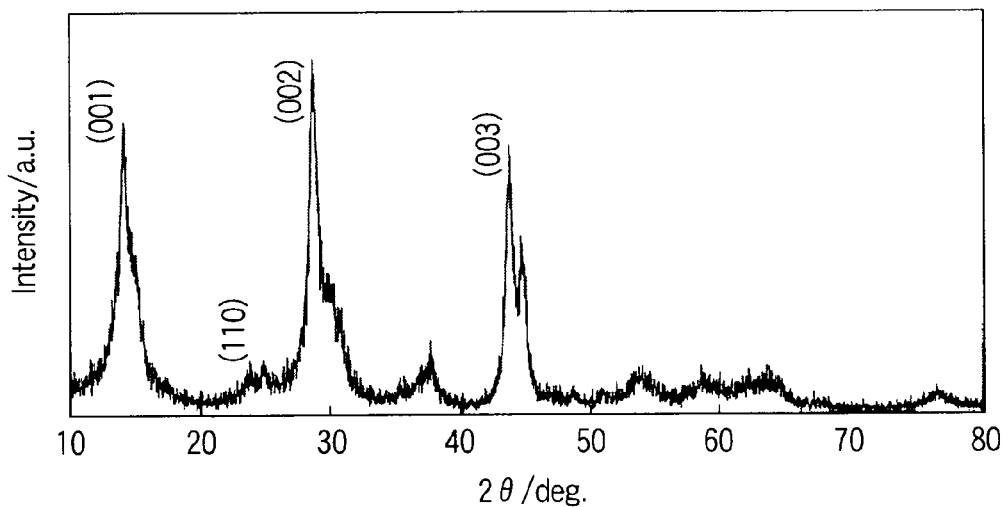
FIG. 10 is a diagram showing an X-ray diffraction of a titanium dioxide powder of Example 2B.

The obtained intermediate product (precursor) $H_2Ti_4O_9$ was heated under three different conditions of the temperature at 350° C. for one hour (Example 2A), three hours (Example 2B), and six hours (Example 2C). In order to obtain an accurate heat history, each of the samples was placed in an electric furnace which was kept at the predetermined temperature and then quickly taken out of the furnace after being heated, then quenched in air. The sample was dried in vacuum at 80° C. for 12 hours. Shown in FIG. 10 is a pattern of X-ray powder diffraction of the powder obtained by Example 2B detected by using Cu-Kα as a radiation source. It was confirmed that each of the obtained diffraction patterns was of titanium dioxide belonging to a space group of C2/m and having the monoclinic $TiO_2(B)$ structure. Further, in each of the diffraction patterns, it was confirmed that a (002) plane exhibited the highest peak intensity, and a half-width (2θ) thereof was 1.86 degrees.

Example 3

A $K_2Ti_4O_9$ powder which was obtained in the same manner as in Example 1 was pulverized by ball mill until a size in the long-axis direction of 5 to 50 μm and in the short-axis direction of about 1 to 5 μm was attained and then added to a 1M hydrochloric acid solution as in Example 1, then stirred at 25° C. for two weeks. Since the obtained suspension had good dispersibility, separation by filtration was difficult. Therefore, separation from the solvent component was conducted by using a centrifugal separator. The obtained proton exchanged $H_2Ti_4O_9$ powder was washed with pure water until a pH of the washing reached 6 to 7.

Figure 11:
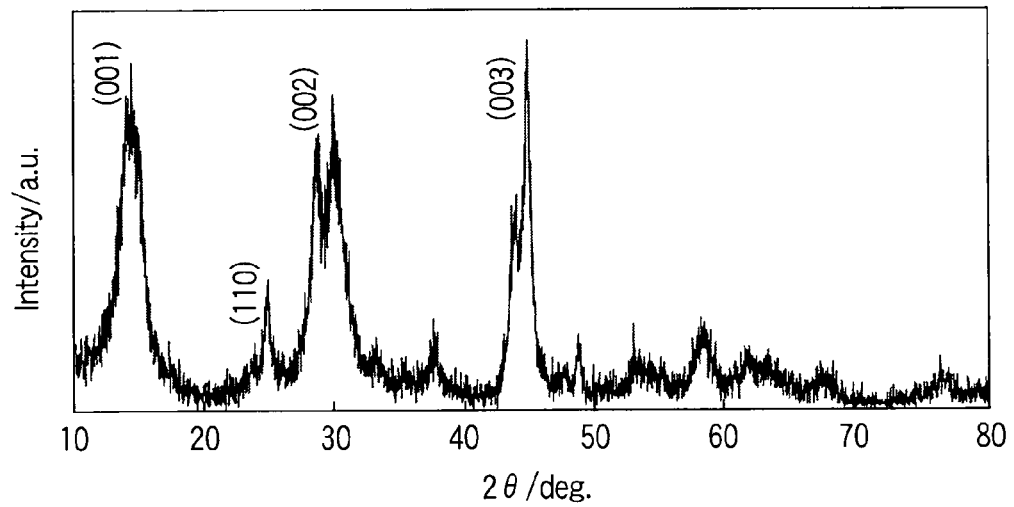
FIG. 11 is a diagram showing an X-ray diffraction of a titanium dioxide powder of Example 3B.

The obtained intermediate product (precursor) $H_2Ti_4O_9$ was heated under three different conditions of the temperature at 350° C. for one hour (Example 3A), three hours (Example 3B), and six hours (Example 3C). In order to obtain an accurate heat history, each of the samples was placed in an electric furnace which was kept at the predetermined temperature and then quickly taken out of the furnace after being heated, then quenched in air. The sample was dried in vacuum at 80° C. for 12 hours. Shown in FIG. 11 is a pattern of X-ray powder diffraction of the powder obtained by Example 3B detected by using Cu-Kα as a radiation source. It was confirmed that each of the obtained diffraction patterns was of titanium dioxide belonging to a space group of C2/m and having the monoclinic $TiO_2(B)$ structure. Further, in each of the diffraction patterns, it was confirmed that a (003) plane exhibited the highest peak intensity, and a half-width (2θ) thereof was 1.10 degrees.

Example 4

A proton titanate compound which is a precursor of $TiO_2$ (B) was synthesized by a hydrothermal method. Commercially available particulate titanium dioxide (average particle diameter: 100 nm) was used as a starting material. To a mixture solution of 60 mL of a sodium hydroxide solution of which a concentration was adjusted to 10 mol/L and 60 mL of ethanol, 1 g of the particulate titanium dioxide was added and then thoroughly stirred and dispersed. The dispersion liquid was transferred to a 150 mL stainless steel autoclave pressure vessel having a polytetrafluoroethylene inner wall and heated at 180° C. for 24 hours. Thus, a nanotube compound in which a specific crystal plane was grown was obtained. After being cooled to a room temperature, the product was washed with 0.5 M hydrochloric acid, and washed with water. The product was placed in a reduced pressure drier to be dried at 80° C. for 12 hours, thereby obtaining a nanotube proton titanate compound. After that, titanium dioxide having the $TiO_2(B)$ structure was obtained by heating the compound at 350° C. for 3 hours. The X-ray powder diffraction measurement results of the material are shown in FIG. 12. The measurement method and measurement conditions of the X-ray powder diffractometry were the same as those of Example 1. Likewise, from the obtained result, it was confirmed that each of the obtained diffraction patterns was of titanium dioxide belonging to a space group of C2/m and having the monoclinic $TiO_2(B)$ structure. Further, in each of the diffraction patterns, it was confirmed that a (001) plane exhibited the highest peak intensity, and a half-width (2θ) thereof was 2.45 degrees.

Example 5

An intermediate product (precursor) $H_2Ti_4O_9$ obtained in the same manner as in Example 1 was heated at 350° C. for 3 hours to obtain titanium dioxide having the target monoclinic $TiO_2(B)$ crystal structure. The obtained product was placed in a zirconia pot having a capacity of 100 cm³, and zirconia balls each having a diameter of 10 mm were added to occupy ⅓ of the pot capacity. The pot was rotated at 800 rpm for a ball mill treatment time of one hour (Example 5A) and 3 hours (Example 5B) so that aspect ratios of 1.6 and 1.2 were attained, respectively. After that, an X-ray powder diffraction measurement of each of the samples was conducted. Measurement conditions were the same as those of Example 1. Though it was confirmed that the obtained diffraction patterns were of titanium dioxide belonging to a space group of C2/m and having the monoclinic $TiO_2(B)$ structure, peak intensity ratios I(110)/I(001) each between a (001) plane having the highest peak and a (110) plane were 0.54 and 0.98, respectively.

Comparative Example 1

A $K_2Ti_4O_9$ powder in the obtained crystalline form, which was obtained in the same manner as in Example 1, was added to a 1M hydrochloric acid solution, and stirred at 25° C. for 2 weeks. Since the obtained suspension had good dispersibility, separation by filtration was difficult. Therefore, separation from the solvent component was conducted by using a centrifugal separator. The obtained proton exchanged $H_2Ti_4O_9$ powder was washed with pure water until a pH of the washing reached 6 to 7.

The obtained intermediate product (precursor) $H_2Ti_4O_9$ was heated at 400° C. for 20 hours. In order to obtain an accurate heat history, the sample was placed in an electric furnace which was kept at the predetermined temperature and then quickly taken out of the furnace after being heated, then quenched in air. The sample was dried in vacuum at 80° C. for 12 hours. Shown in FIG. 13 is a pattern of X-ray powder diffraction of the powder obtained by Comparative Example 1 detected by using Cu-Kα as a radiation source. It was confirmed that the obtained diffraction pattern included the monoclinic $TiO_2(B)$ structure belonging to a space group of C2/m and a trace amount of an impurity phase. Further, it was confirmed that a (001) plane exhibited the highest peak intensity, and a half-width (2θ) thereof was 0.38 degree. which is narrower as compared to the synthetic examples of Examples.

Comparative Example 2

An intermediate product (precursor) $H_2Ti_4O_9$ obtained in the same manner as in Comparative Example 1 was heated at 300° C. for one hour. In order to obtain an accurate heat history, the sample was placed in an electric furnace which was kept at the predetermined temperature and then quickly taken out of the furnace after being heated, and quenched in air. The sample was dried in vacuum at 80° C. for 12 hours. It was confirmed that the diffraction pattern detected from an X-ray powder diffraction pattern using Cu-Kα as a radiation source was of the monoclinic $TiO_2(B)$ belonging to a space group of C2/m. Further, it was confirmed that a (001) plane exhibited the highest peak intensity, and a half-width (2θ) thereof was 4.35 degrees which is wider as compared to the synthetic examples of Examples.

Comparative Example 3

Figure 14:
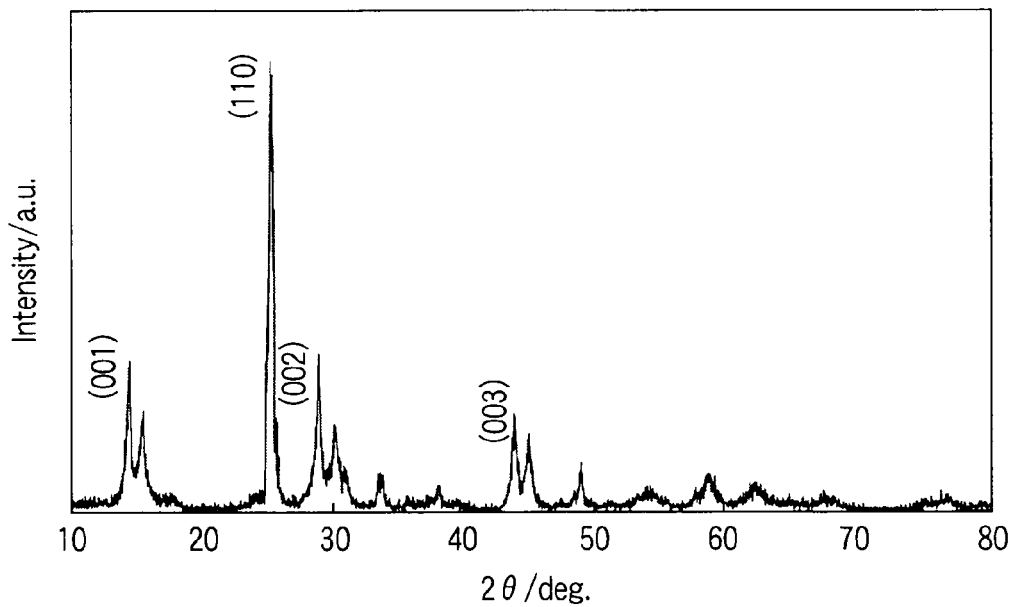
FIG. 14 is a diagram showing an X-ray diffraction of a titanium dioxide powder of Comparative Example 3.

As Comparative Example 3, a titanium oxide $TiO_2$—B having a bronze type structure was synthesized by employing the synthetic method described in JP-A 2008-34368 (KO-KAI). Potassium nitrate and anatase type titanium dioxide were mixed at a predetermined ratio, and $K_2Ti_4O_9$ was obtained by a solid phase reaction of heating to 1000° C. for 24 hours. The compound was thrown into a 1M nitric acid solution, and stirred at an ambient temperature for 12 hours. The obtained powder was washed with distilled water several times and then heated at 400° C. for 3 hours. As shown in FIG. 14, from an X-ray powder diffraction pattern of the obtained powder, which was obtained by using Cu-Kα radiation source, a diffraction pattern of which a main peak was a (110) peak as in the ASTM card No. 35-0088 was obtained, and no specific orientation was observed.

Comparative Example 4

As Comparative Example 4, titanium dioxide having bronze titanate type crystal structure was synthesized by employing the synthetic method described in JP-A 2008-117625 (KOKAI). A sodium carbonate powder which is a high-purity reagent material and a titanium dioxide powder were weighed and mixed at a molar ratio Na:Ti of 2:3, and heated at 800° C. for 20 hours twice. The obtained $Na_2Ti_3O_7$ polycrystal was impregnated into a 0.5M hydrochloric acid solution and retained therein at a room temperature condition for 5 days, thereby performing a proton exchange treatment. After that, a proton exchanged $H_2Ti_3O_7$ polycrystal which was a precursor was obtained by washing and drying in vacuum at 120° C. for 24 hours. Next, the obtained precursor $H_2Ti_3O_7$ polycrystal was treated in air at 320° C. for 20 hours to obtain the titanium dioxide having bronze titanate type crystal structure described in JP-A 2008-117625 (KOKAI). From an X-ray powder diffraction pattern of the obtained powder, which was obtained by using Cu-Kα radiation source, a diffraction pattern of which a main peak was a (110) peak as in the ASTM card No. 35-0088 was obtained, and no specific orientation was observed.

An electrode was obtained by mixing each of the negative electrode active material powders obtained by Examples and Comparative Examples with 10 wt % of polytetrafluoroethylene in terms of a weight ratio as a binder. In the electrode of Comparative Example 1, 30 wt % of acetylene black in terms of a weight ratio was added as a conductive agent. As a counter electrode of each of the electrode, a metal lithium foil was used. Since the lithium metal was used for the counter electrode in each of the measurement cells, an electrode potential of Examples and Comparative Examples becomes noble as compared to the counter electrode. Therefore, directions of charge-discharge are reverse to those observed when each of the electrodes of Examples and Comparative Examples is used as the negative electrode. To be more specific, a reaction in which lithium ions are inserted into the electrode of each of Examples and Comparative Examples corresponds to a discharge reaction. In the present Example, in order to avoid confusion, a reaction in which lithium ions are inserted into the electrode of each of Examples and Comparative Examples is referred to as charging, and a direction in which lithium ions are released is referred to as discharge. As an electrolytic solution, a solution obtained by dissolving lithium perchlorate into a mixture solvent of ethylene carbonate and diethyl carbonate (volume ratio: 1:1) at a concentration of 1M was used.

Electrochemical measurement cells were obtained by using the electrode, the counter electrode, and the electrolytic solution of Examples and Comparative Examples described above. Though the electrode of each of Examples is caused to function as a positive electrode since the lithium metal is used for the negative electrode in the present Examples, it is possible to cause the electrode of each of Examples to function as the negative electrode by combining with a known positive electrode material.

Charge-discharge curves of Examples and Comparative Examples were evaluated. Charge-discharge was performed within a potential range of 1.0 to 3.0 V based on the metal lithium electrode reference. The charge-discharge test was conducted at a charge-discharge current of 0.05 mA/cm² at a room temperature.

Next, in order to confirm that the negative electrode active materials of Examples are capable of stable charging-discharging, charge-discharge of each of the cells of Examples and Comparative Examples was performed for 50 cycle repeatedly (one cycle consists of charge and discharge), and a discharge capacity retention ratio after 50 cycles was investigated. The charge-discharges were conducted within a potential range of 1.0 to 3.0 V based on the metal lithium electrode reference at a charge-discharge current of 0.05 mA/cm² at a room temperature. The discharge capacity retention ratio after 50 cycles was calculated by setting the initial discharge capacity at 0.05 mA/cm² as 100%.

Figure 15:
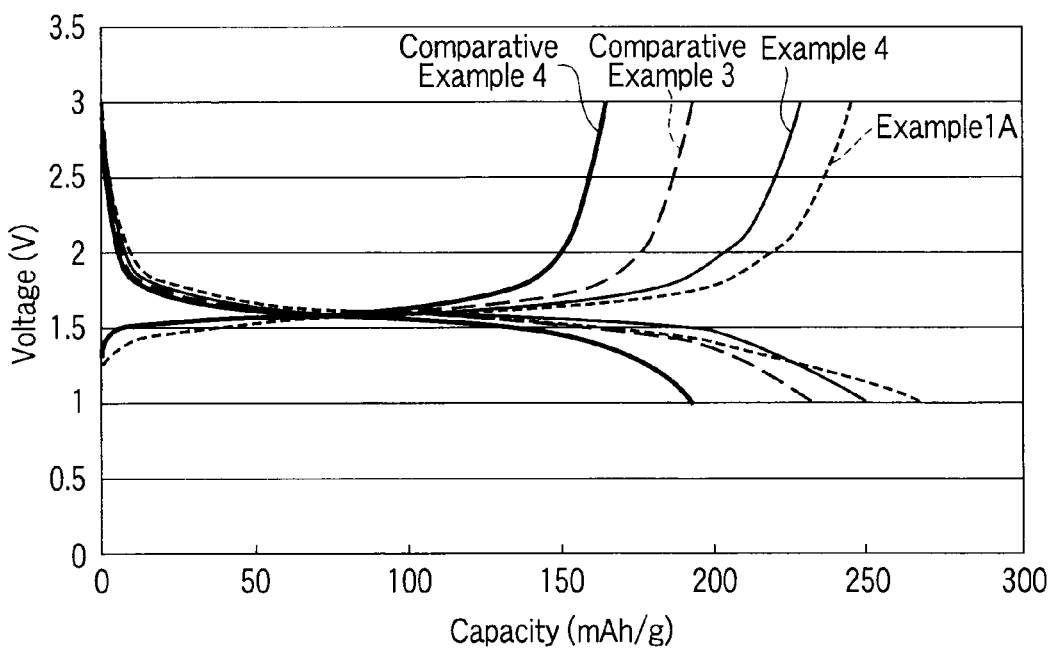
FIG. 15 is a diagram showing charge-discharge curves of Examples 1A and 4 and Comparative Examples 3 and 4.

Discharge curves of Examples 1A and 4 and Comparative Example 3 and 4 are shown in FIG. 15. In Table 1, Miller indices of highest peak, intensity ratio I(110)/I(00Z), half-width (2θ) of highest peak, initial discharge capacity, discharge capacity retention ratio after 50 cycles, initial charge-discharge efficiency, aspect ratio, and BET specific surface area of each of Examples 1 to 5 and Comparative Examples 1 to 4 are shown. The aspect ratio was calculated by measuring the short and long axes of a particle according to the above-described microscopic observation.

TABLE 1

| Synthetic method | Miller indices of highest peak | Half-width of highest peak (degree) | Intensity ratio I(110)/I(00Z) | Initial discharge capacity (mAh/g) | Discharge capacity retention ratio after 50 cycles (%) | Initial charge-discharge efficiency (%) | Aspect ratio | Specific surface area (m²/g) |
|---|---|---|---|---|---|---|---|---|
| Example 1A | (001) | 2.73 | 0.21 | 252 | 96.3 | 86.5 | 3.5 | 17.8 |
| Example 1B | (001) | 1.70 | 0.33 | 235 | 95.1 | 85.5 | 4.3 | 22.5 |
| Example 1C | (001) | 1.05 | 0.34 | 228 | 93.3 | 87.1 | 7.8 | 18.4 |
| Example 2A | (002) | 2.51 | 0.28 | 220 | 94.8 | 83.6 | 3.2 | 33.8 |
| Example 2B | (002) | 1.86 | 0.12 | 215 | 95.5 | 85.6 | 5.5 | 23.1 |
| Example 2C | (002) | 1.01 | 0.20 | 218 | 97.2 | 84.6 | 6.7 | 15.5 |
| Example 3A | (003) | 1.71 | 0.31 | 223 | 94.6 | 85.4 | 4.1 | 27.7 |
| Example 3B | (003) | 1.10 | 0.35 | 211 | 93.8 | 83.8 | 3.8 | 19.8 |
| Example 3C | (003) | 0.88 | 0.29 | 209 | 94.4 | 84.9 | 8.5 | 16.5 |
| Example 4 | (001) | 2.45 | 0.37 | 232 | 87.5 | 79.3 | 37.5 | 220.1 |
| Example 5A | (001) | 2.21 | 0.54 | 221 | 92.1 | 84.1 | 1.6 | 26.5 |
| Example 5B | (001) | 2.13 | 0.98 | 212 | 89.2 | 82.5 | 1.2 | 38.2 |

TABLE 1-continued

| Synthetic method | Miller indices of highest peak | Half-width of highest peak (degree) | Intensity ratio I(110)/I(00Z) | Initial discharge capacity (mAh/g) | Discharge capacity retention ratio after 50 cycles (%) | Initial charge-discharge efficiency (%) | Aspect ratio | Specific surface area (m$^2$/g) |
|---|---|---|---|---|---|---|---|---|
| Comparative Example 1 | (001) | 0.38 | 0.52 | 158 | 95.5 | 85.8 | 3.8 | 7.8 |
| Comparative Example 2 | (001) | 4.35 | 0.25 | 108 | 67.5 | 63.2 | 3.5 | 36.6 |
| Comparative Example 3 | (110) | 0.27 | 3.06 | 195 | 80.9 | 85.2 | — | 8.4 |
| Comparative Example 4 | (110) | 0.31 | 1.10 | 161 | 78.5 | 83.1 | — | 141.0 |

As is apparent from Table 1, it is confirmed that the initial discharge capacity obtained in Examples 1 to 5 is higher than that in Comparative Examples 1 to 4 by 20% to 50%. Further, the good results were obtained in the charge-discharge cycle performance. Further, from the results shown in FIG. 15, it is understood that the discharge curve rises when the capacity exceeds 200 mAh/g in Examples 1A and 4, while the discharge curve rises before the capacity reaches 200 mAh/g in Comparative Examples 3 and 4 of which the highest peak is the (110) peak. From these results, the negative electrode active materials of Examples have the larger discharge capacity and better charge-discharge cycle life as compared to active materials synthesized by the known synthetic method.

Further, as a result of comparison among Examples 1 to 3, it is understood that the high initial discharge capacity is obtained in Example 1 of which the highest peak is a peak of the (001) plane.

In the Miller indices of the highest peaks described in the Examples, the peak intensity order can be changed among the (001), (002), and (003) planes depending on measurement condition such as various slits of an X-ray powder diffraction measurement apparatus, a sampling method, and the like. Such possibility is attributed to a possibility of a fluctuation in intensity of around 10% which can be caused depending on a measurement method, because the peak intensities of the (001), (002), and (003) planes are close each other. However, it is possible to attain the effects described in the embodiments when at least one of the three Miller indices has the highest intensity peak.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A negative electrode active material, comprising a compound having a crystal structure of monoclinic titanium dioxide, of which a highest intensity peak detected by an X-ray powder diffractometry using a Cu-Kα radiation source is a peak of a (001) plane, (002) plane, or (003) plane; and a half-width (2θ) of the highest intensity peak falls within a range of 0.5 degree to 4 degrees.

2. The active material according to claim 1, wherein the compound satisfies the following expression (1):

$$0 \leq I(110)/I(00Z) \leq 1 \quad (1),$$

provided that I(00Z) is intensity of the highest intensity peak; and I(110) is intensity of a peak of a (110) plane in the X-ray powder diffractometry.

3. The active material according to claim 2, wherein the compound comprises a crystal having a short axis of 0.1 to 50 μm, a long axis of 0.1 to 200 μm, and an aspect ratio of 1 to 50.

4. The active material according to claim 2, wherein the compound comprises a crystal having the long axis of 50 to 200 μm and the aspect ratio of 10 to 50.

5. The active material according to claim 3, wherein the compound is represented by $Li_xTiO_2$ ($0 \leq x \leq 1$).

6. The active material according to claim 1, wherein the crystal structure of monoclinic titanium dioxide is represented by a space group C2/m.

7. The active material according to claim 1, wherein the half-width (2θ) of the highest intensity peak falls within a range of 0.6 degree to 2 degrees.

8. The active material according to claim 1, wherein the highest intensity peak is the peak of the (001) plane.

9. The active material according to claim 1, which comprises the compound having the crystal structure of monoclinic titanium dioxide, and at least one selected from the group consisting of anatase type titanium dioxide, ramsdellite type lithium titanate and spinel type lithium titanate.

10. A nonaqueous electrolyte battery, comprising:
a positive electrode capable of absorbing and releasing lithium;
a negative electrode comprising the negative electrode active material defined in claim 1; and
a nonaqueous electrolyte.

11. A battery pack, comprising a nonaqueous electrolyte battery comprising:
a positive electrode capable of absorbing and releasing lithium;
a negative electrode comprising the negative electrode active material defined in claim 1; and
a nonaqueous electrolyte.

* * * * *